(12) United States Patent
Butler et al.

(10) Patent No.: US 8,177,394 B2
(45) Date of Patent: May 15, 2012

(54) STEREOSCOPIC ILLUMINATION SYSTEM FOR MICROSCOPE

(75) Inventors: Jonathan Michael Butler, Gainesville, GA (US); Robert Troy Hewlett, Cumming, GA (US); Robert Jeffrey Hewlett, Dawsonville, GA (US); Robert McCoy Hewlett, Cumming, GA (US)

(73) Assignee: Endure Medical, Inc., Cummings, GA (US)

( * ) Notice: Subject to any disclaimer, the term of this patent is extended or adjusted under 35 U.S.C. 154(b) by 744 days.

(21) Appl. No.: 12/267,380

(22) Filed: Nov. 7, 2008

(65) Prior Publication Data

US 2010/0118549 A1 May 13, 2010

(51) Int. Cl.
*F21V 33/00* (2006.01)

(52) U.S. Cl. ........ 362/253; 362/234; 362/572; 359/385; 359/389

(58) Field of Classification Search .................. 362/572, 362/253, 234; 359/385, 389
See application file for complete search history.

(56) References Cited

U.S. PATENT DOCUMENTS

| | | | |
|---|---|---|---|
| 2,146,506 A | 2/1939 | Maisch | |
| 2,471,879 A | 5/1949 | Lowber et al. | |
| 3,512,860 A | 5/1970 | Hansen et al. | |
| 4,779,968 A | 10/1988 | Sander | |
| 4,991,947 A | 2/1991 | Sander | |
| 5,126,877 A | 6/1992 | Biber | |
| 5,198,927 A | 3/1993 | Rathbone et al. | |
| 5,349,468 A | 9/1994 | Rathbone et al. | |
| 5,469,259 A * | 11/1995 | Golby et al. | 356/495 |
| 5,785,651 A | 7/1998 | Kuhn | |
| 5,835,514 A | 11/1998 | Yuen | |
| 5,856,883 A | 1/1999 | Sander | |
| 5,982,732 A * | 11/1999 | Yamanaka | 369/112.15 |
| 6,271,963 B1 | 8/2001 | Friefield | |
| 6,369,928 B1 | 4/2002 | Mandella | |
| 6,677,596 B2 | 1/2004 | Englehardt | |
| 7,193,775 B2 | 3/2007 | Olszak et al. | |
| 7,307,785 B2 | 12/2007 | Oberbski et al. | |
| 7,345,814 B2 | 3/2008 | Yoneyama | |
| 2007/0268575 A1 | 11/2007 | Yamazaki | |

FOREIGN PATENT DOCUMENTS

DE 4417273 A1 11/1995

OTHER PUBLICATIONS

Authorized officer Blaine R. Copenheaver (ISA/US) "International Search Report" for PCT/US09/62155, Dec. 15, 2009.
Authorized officer Diane Lee (IPEA/US) "International Preliminary Report on Patentability" for PCT/US09/62155, Apr. 13, 2011.
Carl Zeiss Website Materials on Lumera, Carl Zeiss Sets Standard in Ophthalmology, Sep. 2007.
Video Journal of Ophthalmology, Operating with the High Definition View of the Lumera Microscope, vol. XXIV, 2008. Excerpt with Screen Shot of Stereo Coaxial Illumination.
Bird, Joseph, "Demand for Chapter II Examination" for PCT/US09/62155, Jun. 10, 2010.

* cited by examiner

*Primary Examiner* — Laura Tso
(74) *Attorney, Agent, or Firm* — Bradley Arant Boult Cummings; Joseph S. Bird, III

(57) ABSTRACT

The invention is a novel stereoscopic illumination system for a microscope which delivers at least two collimated light beams to a subject surface. Each of the two collimated light beams is delivered for an eye of the user. Additionally, a third light beam is provided at an angle oblique to the other two collimated light beams.

23 Claims, 13 Drawing Sheets

STEREOSCOPIC ILLUMINATION SYSTEM FOR MICROSCOPE

FIELD OF THE INVENTION

The present invention is a novel stereoscopic illumination system for a microscope.

BACKGROUND OF THE INVENTION

Microscopes are used in many different fields. The present invention can be used in any field but is especially useful in surgical settings or any other application in which highly three dimensional objects require magnification, particularly those partially occluded by an enclosure. An example of this is ophthalmic surgery.

In the surgical setting, there have been a number of different microscopes designed and sold for this application. Some of these microscopes are represented in the figures labeled as prior art. None of the prior art microscopes deliver two collimated light beams in stereoscopic to the subject surface, e.g., the tissue under examination in a surgical procedure.

The prior art microscopes have delivered to the subject surface (1) one or more uncollimated light beams from the objective lens or (2) a single uncollimated light beam below the objective. See FIGS. 8-10. Routing a parallel light beam through the objective lens transmits a light beam which is not collimated.

SUMMARY OF THE INVENTION

The novel aspect of the illumination system is delivery of two collimated light beams to the subject surface which at least partially overlap, producing stereoscopic illumination. Additionally, an independent system of illumination is provided at an angle oblique to the stereoscopic system. Either system can be used together or separately.

As defined herein and unless otherwise stated, (a) "collimated light" means light rays from any light source which are partially parallel instead of converging or diverging; and (b) "collimation" means the process of arranging converging or diverging light beams so that they are at least partially parallel. If the light source for each stereoscopic beam was truly a point source there would be little overlap of the beams on the subject surface. With a white light source the focal length of the lens varies with wavelength. An ideally collimated beam would result from a monochromatic point source located at the focal point of the condenser lens. The larger the light source, however, the more other effects occur. Light from one side of the bulb, for example, enters the condenser lens at a different point than light from the bulb's other side and therefore they behave differently as they exit the lens. Light that lies directly on the optical axis of the lens is collimated but the off axis light creates some divergence in the beams.

BRIEF DESCRIPTION OF THE FIGURES

FIGS. 8 and 8a are depictions of a prior art illumination system believed to be the Zeiss Red Reflex Enhancing Module which delivered a single uncollimated light beam from a single light source to the subject surface through objective lens 101 or 101a. This module is believed to be described in U.S. Pat. No. 4,779,968, wherein FIGS. 1 and 3 depict the beam to the subject surface passing through an objective lens which is uncollimated. The numbered elements on FIGS. 8 and 8a are those taken from U.S. Pat. No. 4,779,968 plus 100 so as to distinguish them from the numbered elements in the present specification.

DETAILED DESCRIPTION

Figure 1:
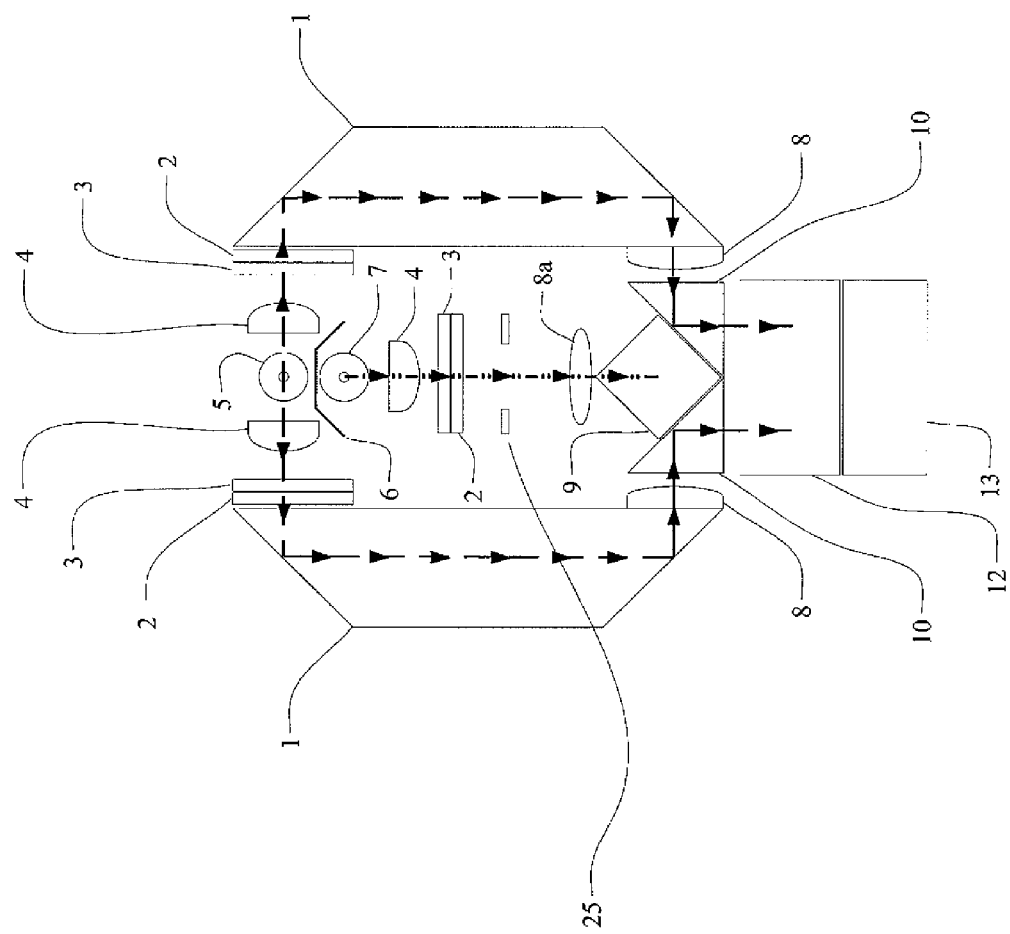
FIG. 1 is a view from the top of the illumination system showing the stereoscopic illumination system and the oblique illumination system. The lines with arrows represent the centers of the light beams from their source until they reflect against the beamsplitter (for stereoscopic) and against the full mirror (for oblique).
Figure 2:
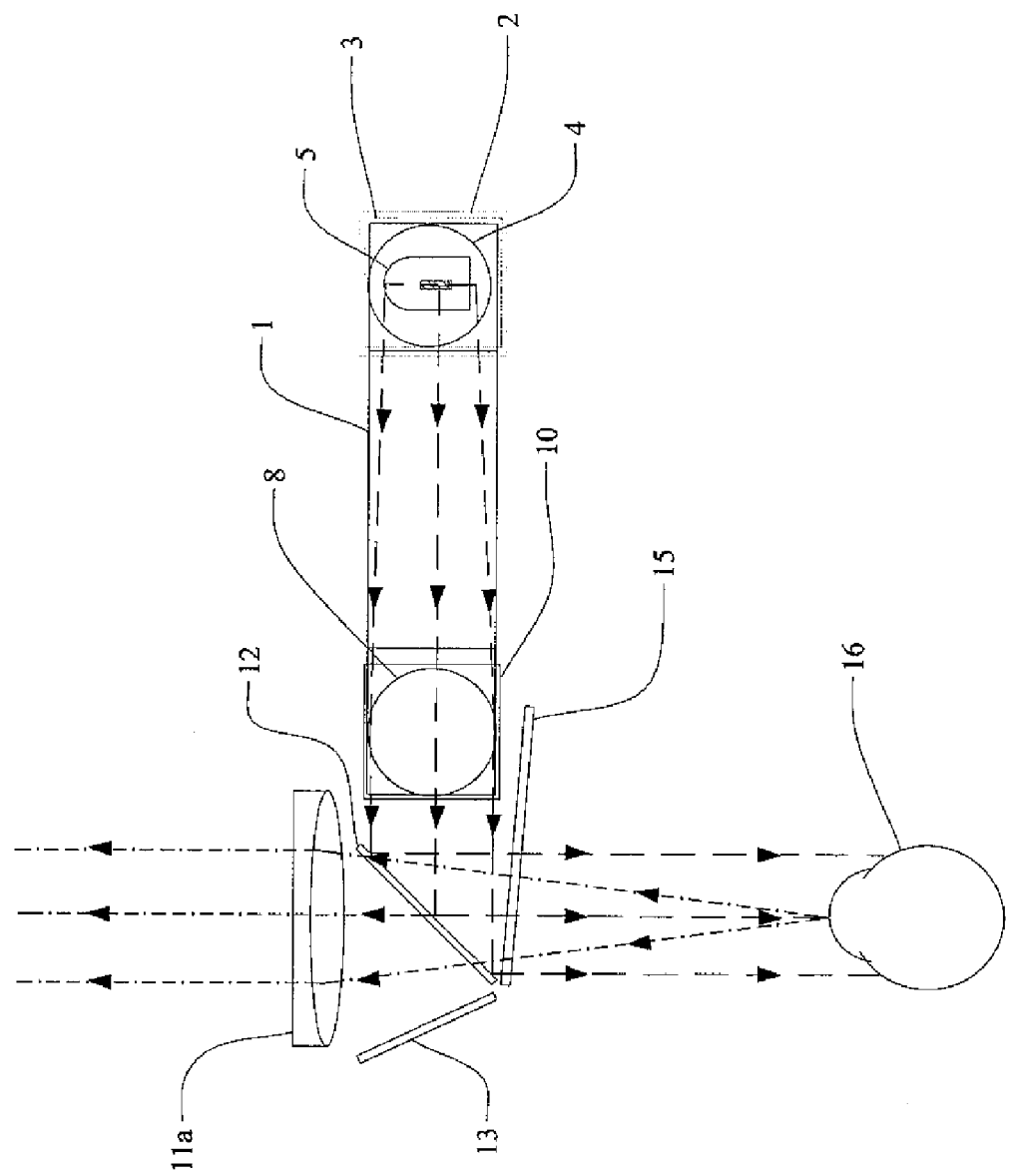
FIG. 2 is a side schematic view of one side of the stereoscopic illumination system. It shows a single collimated light beam illuminating the subject surface, in this instance an eye, and light from the eye's red reflex traveling through the objective lens toward the binoculars.
Figure 3:
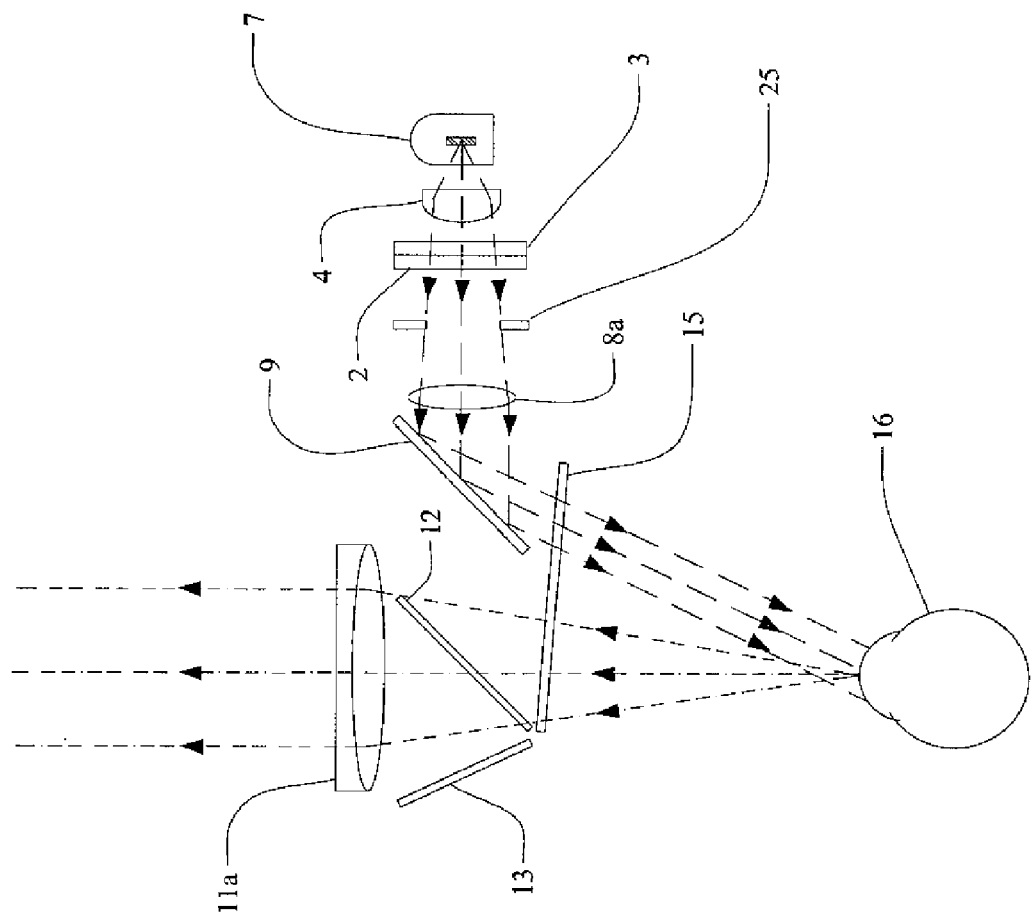
FIG. 3 is a side schematic view of the oblique illumination system, in which the light is offset at an angle oblique to the stereoscopic illumination system. It shows a light beam illuminating the subject surface, in this instance an eye, and light from the eye's red reflex traveling through the objective lens toward the binoculars.
Figure 4:
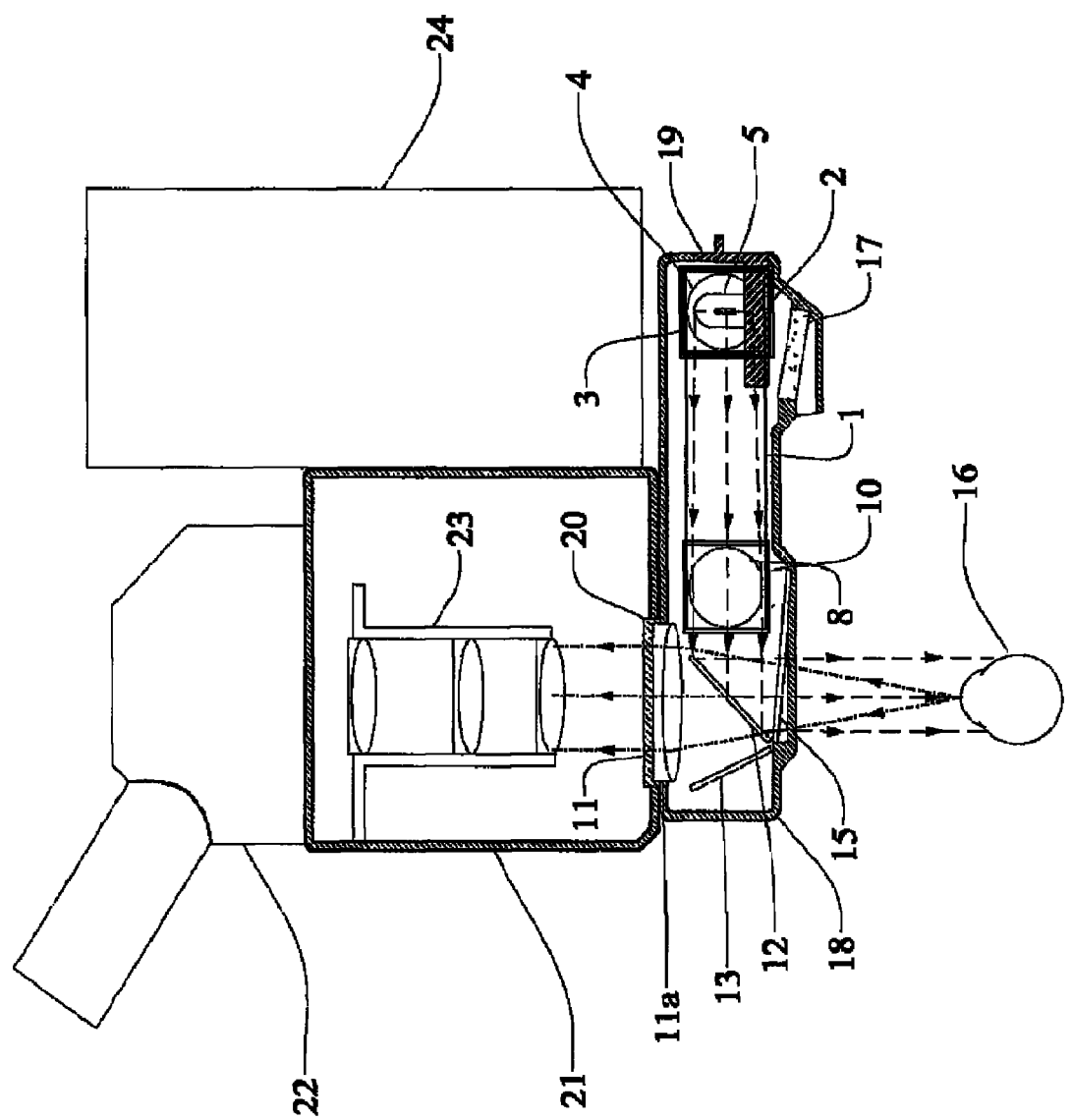
FIG. 4 is a side view of the invention as a detachable module for an existing microscope, including a side schematic view of the stereoscopic illumination system and how the light beam illuminates the subject surface. It shows a collimated light beam illuminating the subject surface, in this instance an eye, and light from the eye's red reflex traveling through the objective lens toward the binoculars.
Figure 4A:
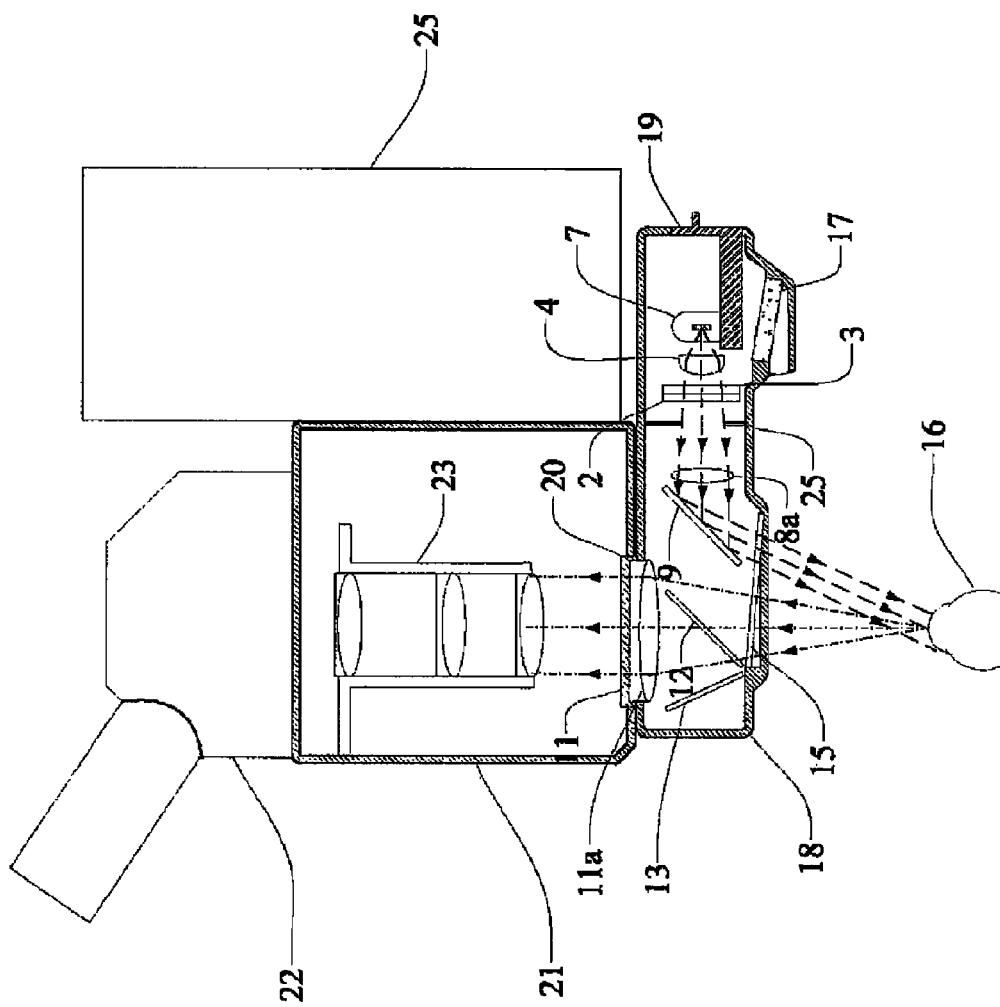
FIG. 4a is a side view of the invention as a detachable module for an existing microscope, including a side schematic view of the oblique illumination system and how the light beam illuminates the subject surface. It shows a light beam illuminating the subject surface, in this instance an eye, and light from the eye's red reflex traveling through the objective lens toward the binoculars.
Figure 5:
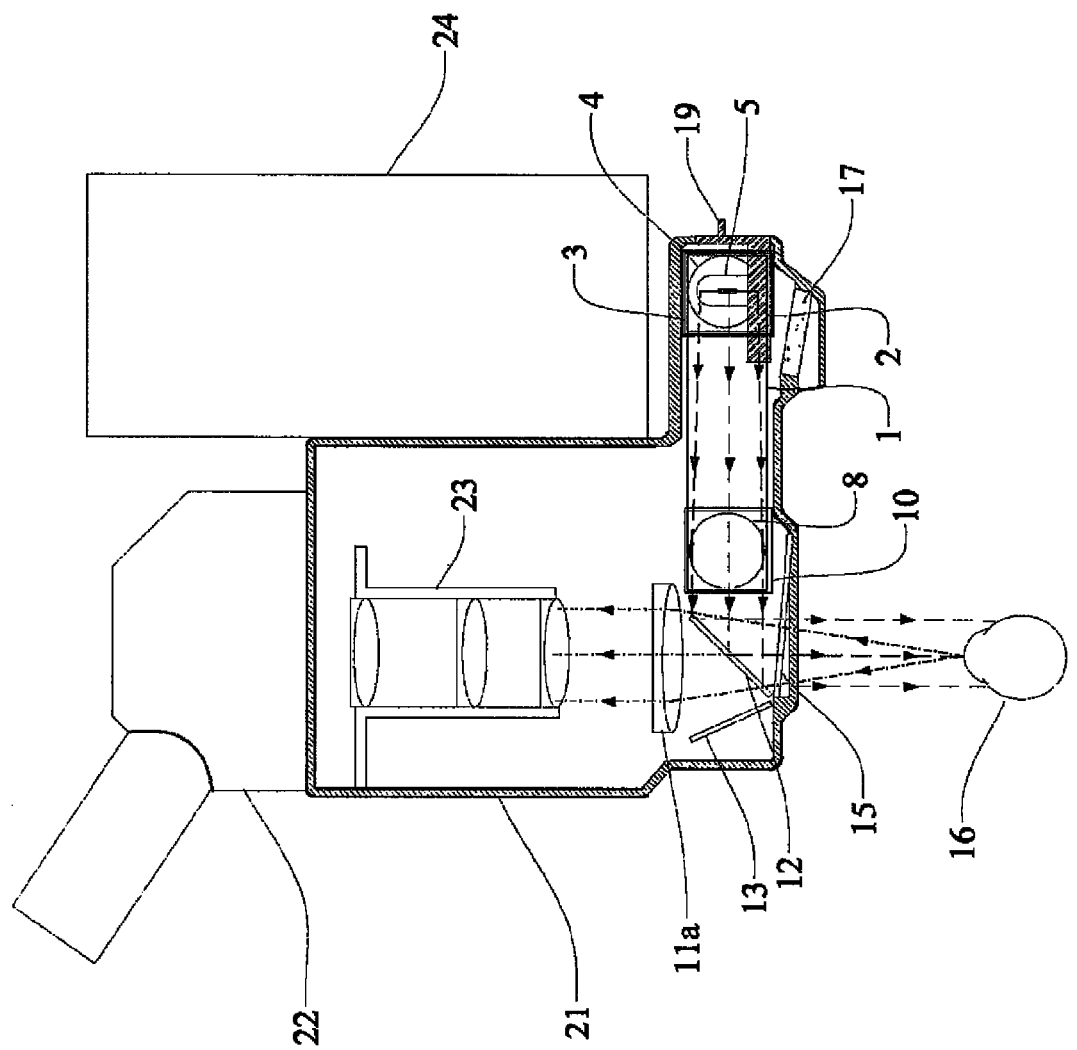
FIG. 5 is a side view of the invention as a module attached to an existing microscope, including a side schematic view of the stereoscopic illumination system and how the light beam illuminates the subject surface. It shows a collimated light beam illuminating the subject surface, in this instance an eye, and light from the red reflex traveling through the objective lens toward the binoculars.
Figure 5A:
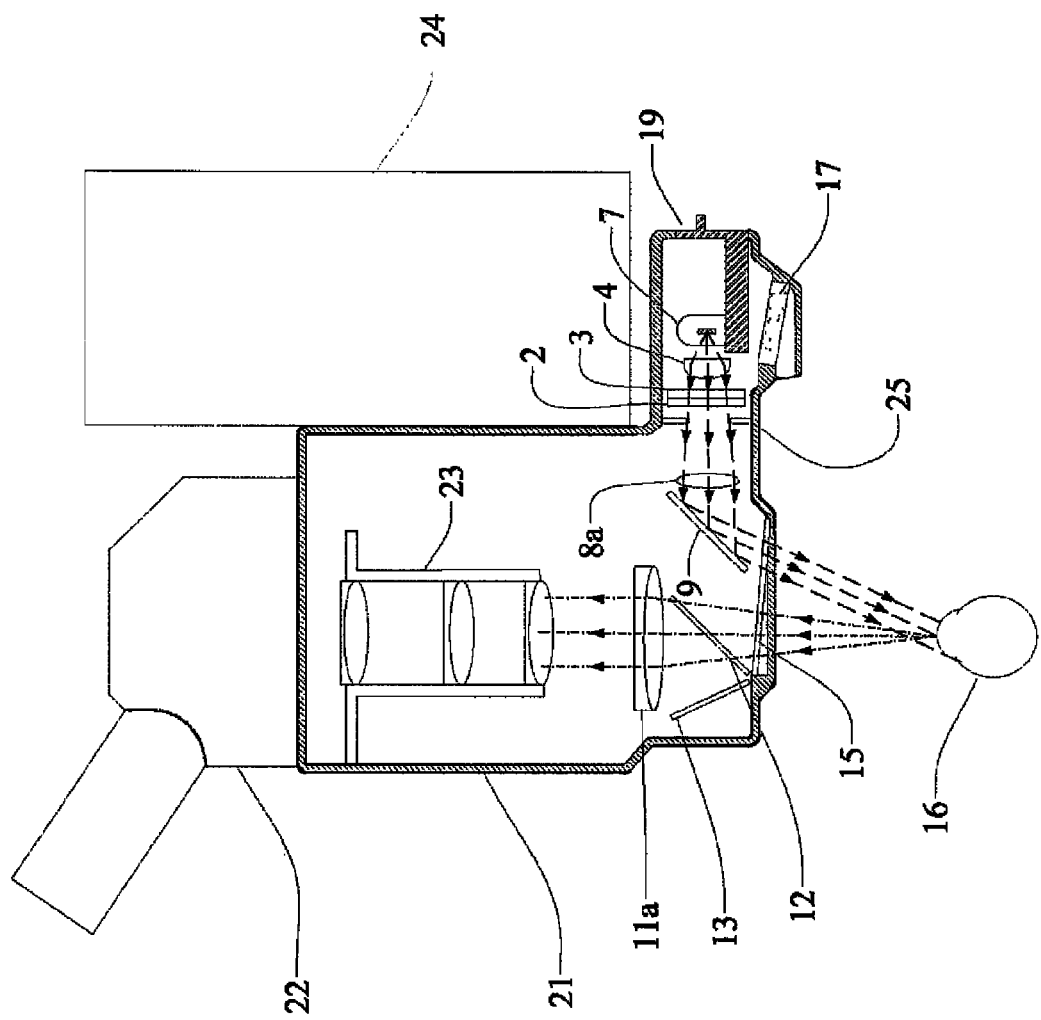
FIG. 5a is a side view of the invention as a module attached to an existing microscope, including a side schematic view of the oblique illumination system and how the light beam illuminates the subject surface. It shows a light beam illuminating the subject surface, in this instance an eye, and light from the red reflex traveling through the objective lens toward the binoculars.
Figure 6:
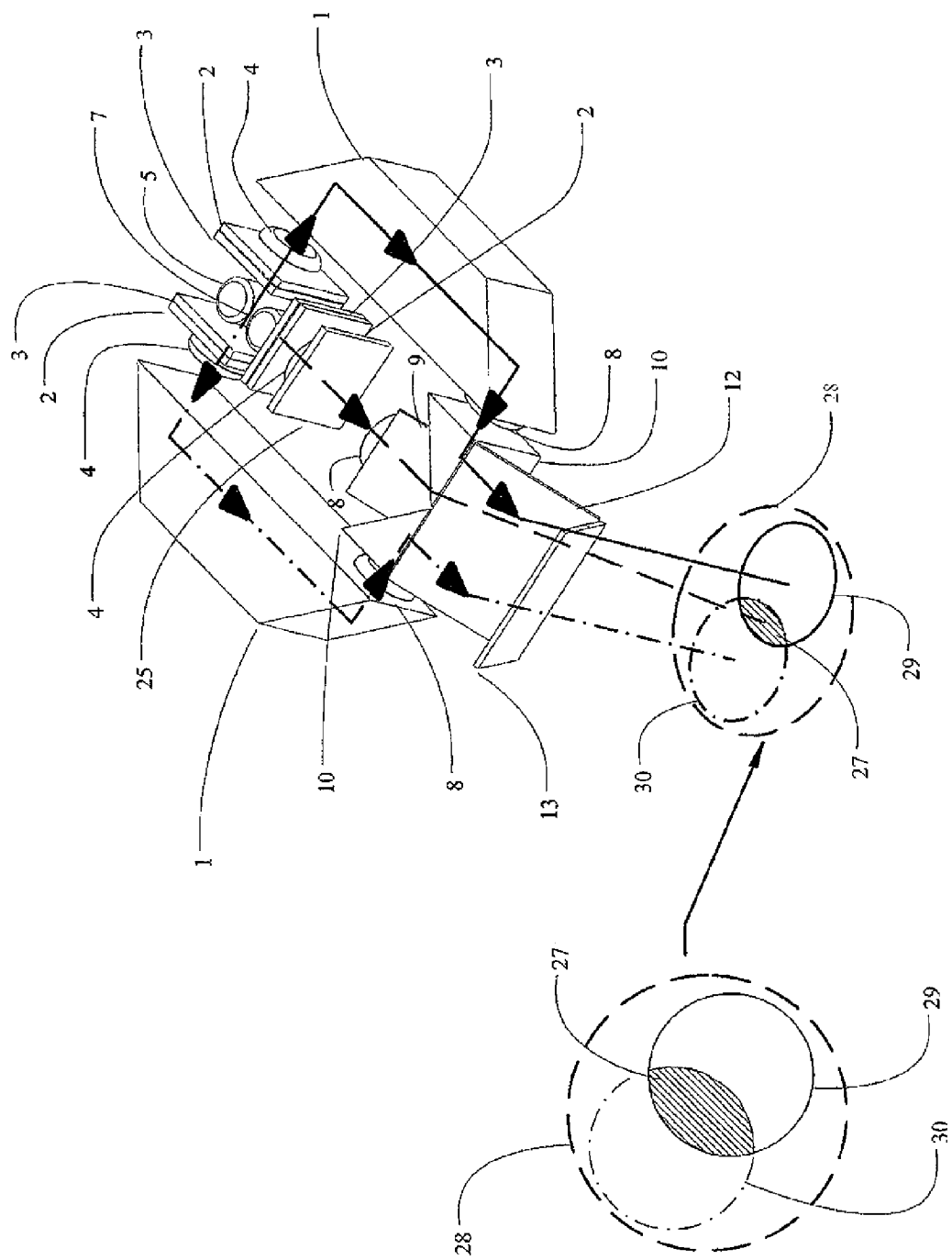
FIG. 6 is a 3 dimensional cutaway of the illumination system including the stereoscopic and the oblique illumination systems, the centers of the light beams, and the patterns of illumination on the subject surface.
Figure 7:
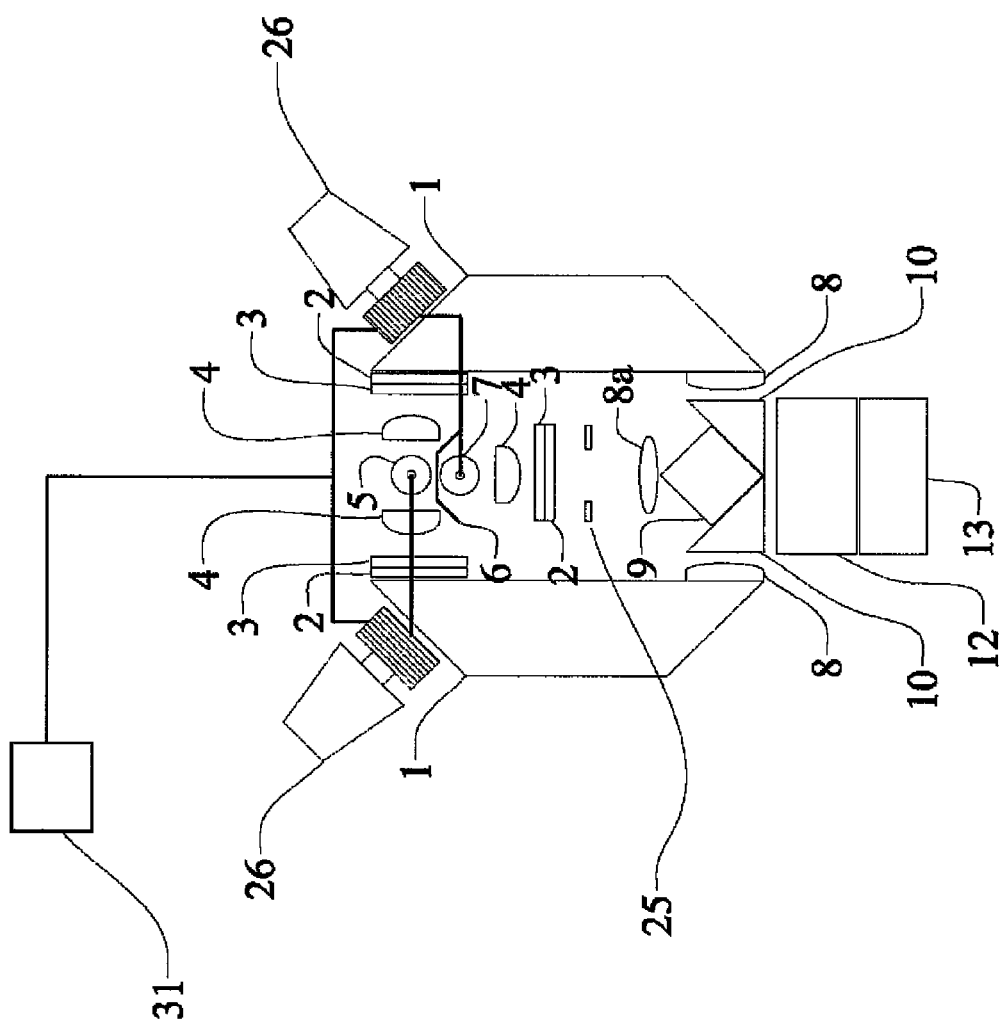
FIG. 7 depicts the illumination systems with rheostats, for independent control of each illumination source, and their connections to an external power source.
Figure 8:
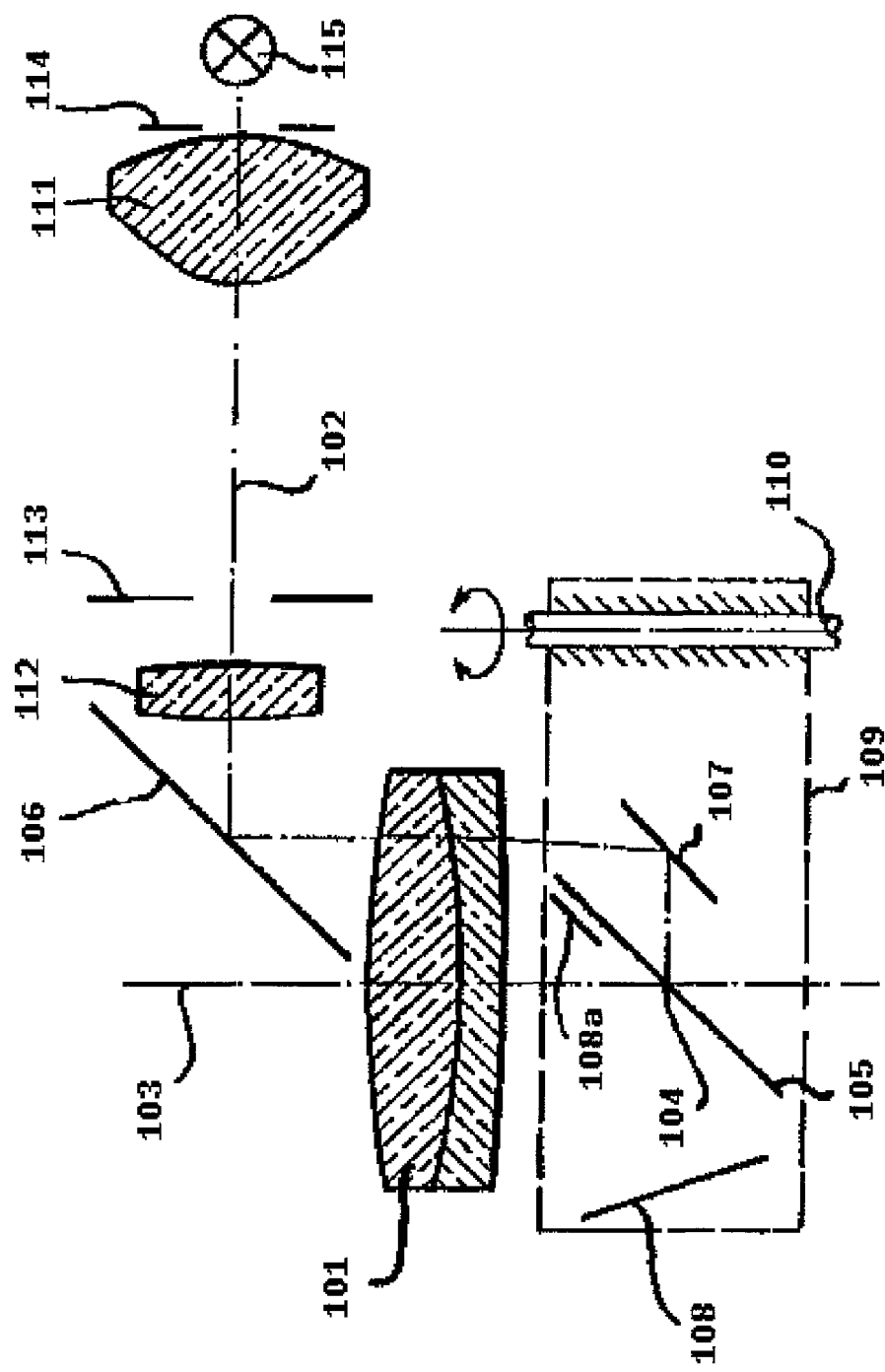
Figure 8A:
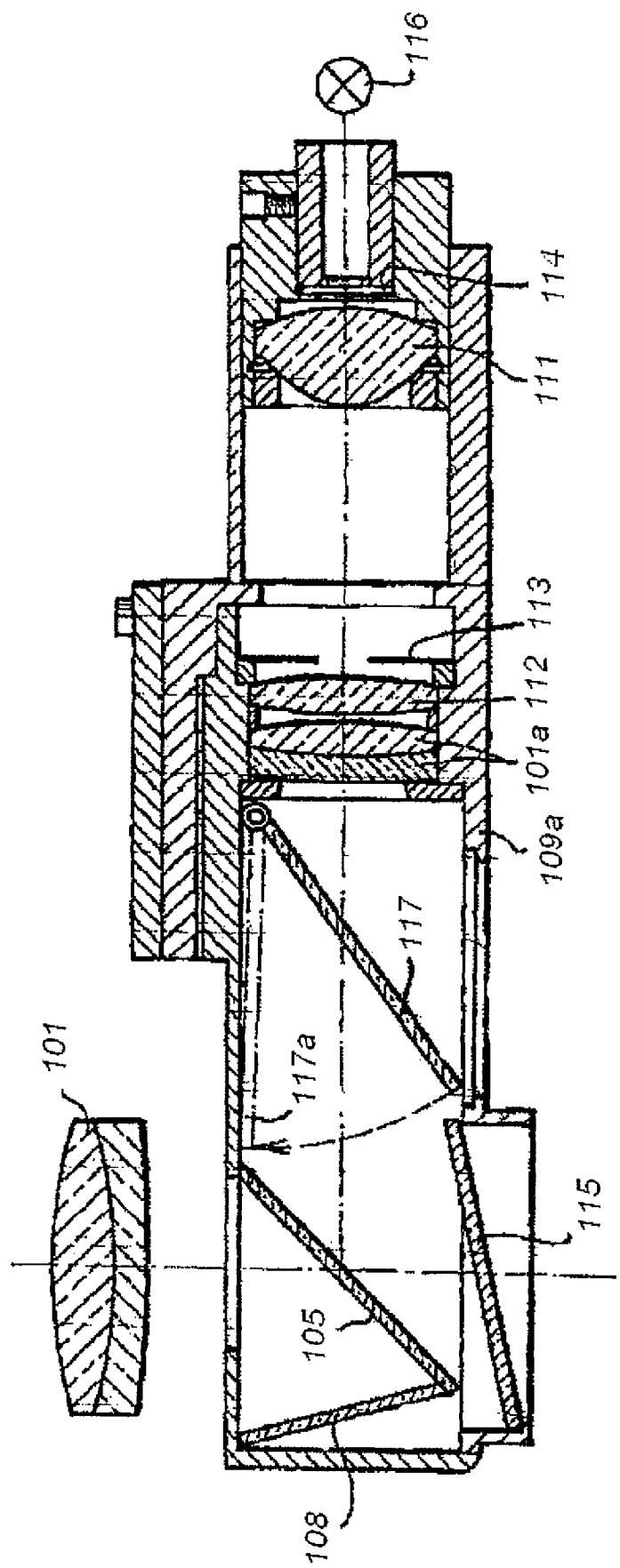
Figure 9:
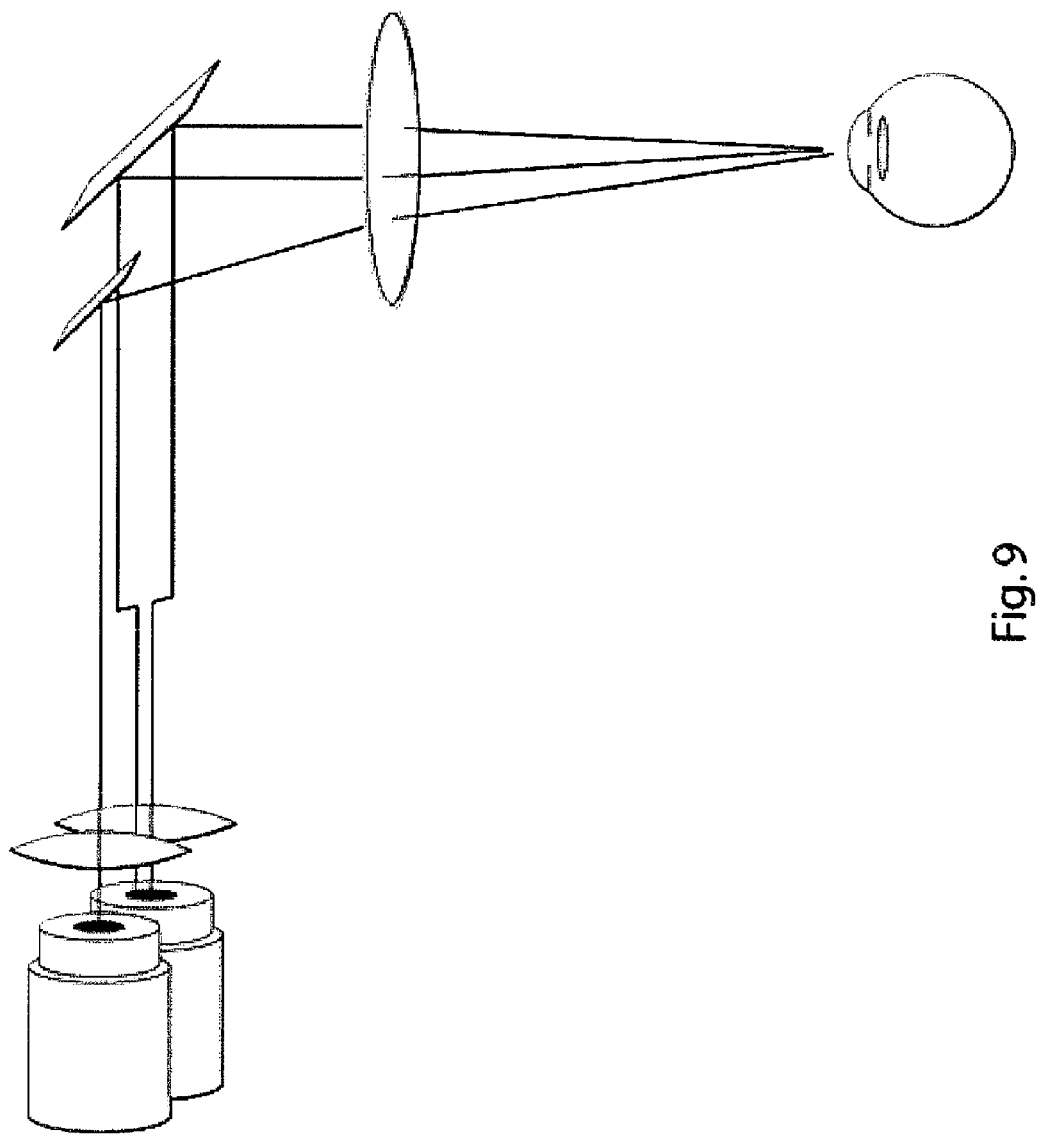
FIG. 9 is a depiction of a prior art illumination system believed to be from the Zeiss Lumera microscope which delivers two focused (uncollimated) beams to the subject surface through the objective lens.
Figure 10:
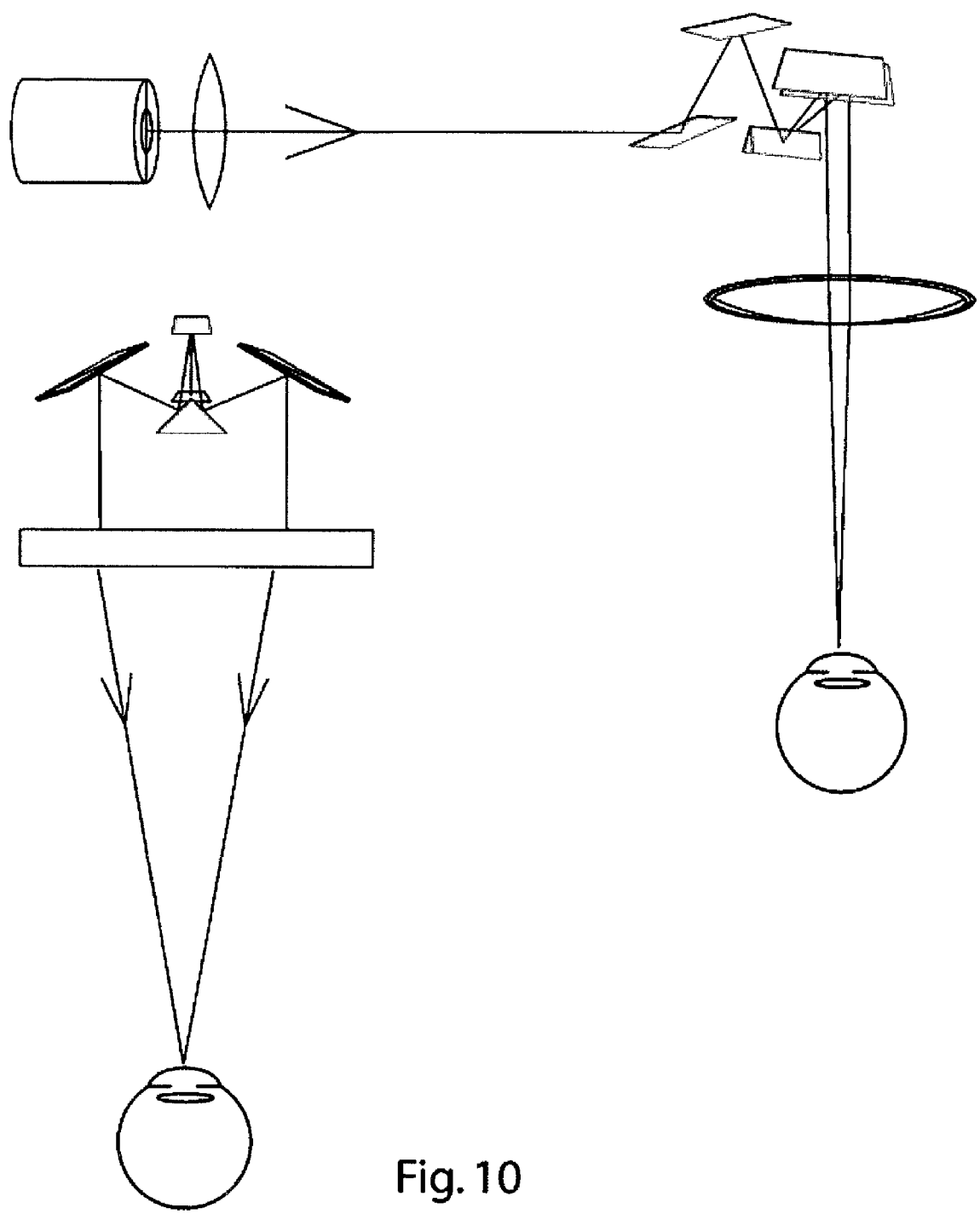
FIG. 10 is a depiction of a prior art illumination system believed to be from the Moller EOS 900 microscope which delivered two focused (uncollimated) light beams through the objective lens to the subject surface.

The invention is an illumination system for a microscope, the illumination system being below the objective lens of the microscope. The invention contains two illumination systems, the first being the stereoscopic system which delivers two beams of collimated light (as defined herein) to the subject surface 16. These two beams of collimated light overlap on the subject surface at least partially. The advantage of the stereoscopic collimated light is a better three dimensional view than produced by prior art illumination systems under similar circumstances. Compared to uncollimated light, delivering collimated light into a partially occluded opening allows a (a) greater quantity of light and (b) more direct light. The at least partial overlap of the collimated light allows the user viewing through binoculars to view the subject surface optimally with stereopsis. An additional illumination system at an angle oblique to the stereoscopic system is also provided, but the light for the oblique system need not be collimated.

A preferred embodiment produces collimated light beams for each of the two stereoscopic light beams by passing light through an aspheric condensing lens and then through a plano-convex lens positioned at the appropriate focal plane. The collimation can be accomplished at multiple points between the light source and the subject surface (e.g., before or after filtering, or before or after the beam is split).

The invention can be built into an entire microscope or can be constructed as a module fitting onto an existing microscope. If constructed as a module, the module includes an objective lens 11a that replaces the objective lens of the microscope. Situated below the included objective lens 11a of the module type or of the objective lens of the built-in type, are illumination components for directing light to the subject surface 16. The construction of the microscope may be altered substantially without affecting the illumination system.

In a preferred embodiment, one light source produces two beams of light for the stereoscopic system which are directed by the following elements to the subject surface 16 as two collimated light beams. In another embodiment, the two collimated light beams are produced by two light sources, one for each light beam. The illumination components of the light source 5 for the stereoscopic system and the light source 7 for the oblique system are located inside the module or existing microscope and are separated by an opaque barrier 6. A beam from the stereoscopic light source 5 is collected by two condensing lenses 4 that gather and concentrate the light.

In a preferred embodiment, each gathered and concentrated light beam passing through a condensing lens is transmitted through an infrared filter 3 then through an ultraviolet filter 2 and then through a collimating lens 8. In one embodiment, a collimating lens is a double convex lens (i.e., with a curved surface on both sides) with a positive focal length which, when used in conjunction with an upstream aspheric condensing lens and positioned at the appropriate focal plane, produces collimated light.

In a preferred embodiment, however, one light source for the stereoscopic system is used to produce two beams of light in the following manner. A beam from each of two sides of the light source is directed through a Dove prism 1 (bending light twice for a total of 180°) before reaching the collimating lens 8. After passing through the collimating lenses, each collimated light beam is then refracted by a 90° prism 10. Each column of collimated light exits its 90° prism 10 parallel to the other so that each strikes a beamsplitter 12 at an angle so that a portion of each column of collimated light is reflected downward toward the subject surface 16.

These columns of collimated light reflected from the beam splitter 12 downward to the subject surface 16 overlap each other at least partially at the stereoscopic illumination overlap 27 as dictated by the focal length of the included objective lens 11a. The portion of light from the collimated beams of light passing through the beamsplitter 12 is absorbed by an anti-reflective light absorber 13. In a preferred embodiment, the beamsplitter 12 splits the light in half, one half reflected to the subject surface 16 and the other half passes through the beamsplitter to the anti-reflective light absorber 13. The beamsplitter 12 can be a half mirror or a mirror partially reflective in another fraction (e.g., three quarters reflective). The function of the beamsplitter 12 is to allow light to pass upward from the subject surface 16 to the binoculars 22 for the user. The collimated light beams are coaxial with the light transmitted to the binoculars. A plano glass cover 15 encloses the bottom portion of the module to protect the components from contaminants.

Three beams of light are required for the invention, but they can be achieved in various ways. One way would be to use three light sources with each one having its own set of condensing and collimating lenses. Another way would be to use two light sources, like the model depicted herein. This would utilize light emitting from two sides of one bulb for the stereo paths, and the second light source for the oblique path. Another way would be to use one source. Light could be gathered from three sides of the bulb, condensed and collimated separately to form the three needed beams, or light could be gathered and then optically split into separate beams later on down the pathway. The significant advantage to using more than one light source, is the ability to adjust the illumination ratio between stereo and oblique light for optimal viewing. Using one source and having the ability to adjust light ratios would require mechanical shutters to block light accordingly. Another variance to the light source is to use fiberoptic light source. This merely removes the actual bulbs from the close proximity of the system and places them in a more remote location. The advantages of this are the ability to use higher power light sources that would not realistically fit in the module, heat generated by the bulbs being removed from proximity of the surgical procedure, and noise and air from the internal fan also being removed to the remote site. One disadvantage with a fiberoptic system is light loss through the fiberoptic cable. Another variance for light sourcing is an LED (Light Emitting Diode) light source. It is also possible to have any combination of LED, bulb, and fiberoptic sources all in one system.

A light source for the oblique system 7 is located so that light from said the second light source is directed through a condensing lens 4 that gathers and concentrates the light from the light source 7. The gathered and concentrated light from the condensing lens 4 is transmitted through an infrared filter 3, and an ultraviolet filter 2 to a collecting lens 8a which collects diverging light from the condensing lens 4. The light passes through the collecting lens 8a and is reflected downward toward the subject surface 16 at an angle so that oblique illumination 28 of the subject surface 16 is accomplished. The oblique illumination 28 covers the entire visual field for both eyes of the user, assuming the objective is at a middle range or higher. The oblique illumination 28 can be reduced by an adjustable mechanical aperture 25 so that the illumination is centered in a smaller area of the subject surface 16, for instance the iris of an eye only, to eliminate glare to the user from light reflecting from the sclera of the eye.

The infrared filter 3 and ultraviolet filter 2 can be placed at any convenient position in the pathway between the light sources 5, 7 and the subject surface 16.

Rheostats 26 control the intensity of the two light sources 5, 7 to control the amount of light projected to the subject surface 16.

A cooling fan 17 is mounted in close proximity to the bulb tray 19 or other light sources in the illumination system.

The housing 18 of the modular component contains a fitting for connection to an existing microscope. This fitting attaches at the existing microscope's objective lens receptacle after the existing microscope's objective lens is removed. This fitting locks the module housing 18 in place in the existing microscope's objective lens receptacle 11. A preferred embodiment of this fitting is an attachment ring 20 which screws or otherwise mounts onto the existing microscope.

For the full microscope containing the invention, the binoculars 22 are in communication with zoom optics 23 which are housed in the microscope body 21 and are in communication with the objective lens 11a. There is a focus drive housing 24.

The built-in system is completely enclosed in the body of the microscope below the zoom system and the objective lens 11a.

Ancillary optics 9, such as mirrors and prisms, are used to refract the light so that the projected beams exit the system at proper angles. They could also be used to split a single light beam into two light beams. This could be done if only light source was being used, or if a fiberoptic system was used and the incoming beam needed to be converted to two or three beams. This placement of the ancillary optics for light redirection or splitting along the pathway is irrelevant to the function as long as the beams are directed to the proper locations, but keeping in mind losses that occur at each light interface.

There are numerous combinations that could be achieved using one or more of the same or different light sources, mirrors and prisms for directing light around inside the system, using prisms to split beams at any point along the light pathway if there are not enough beams from light sources, using or not using a mechanical shutter for illumination intensity control, placement of the ultraviolet and infrared filters, and even the direction and angle at which the oblique light illuminates the field. Ultimately, these variances if done properly, all result in two collimated stereo illumination beams hitting the beamsplitter 12 set at a forty-five degree angle in the direct path of the optical viewing pathways of a microscope, and a third oblique illumination beam hitting the subject surface 16 at some offset angle with the ability to control the levels and/or ratios of said illumination.

What is claimed is:

1. An illumination system for a microscope comprising
   a. means for projecting a plurality of collimated light beams,
   b. a beamsplitter configured to direct a portion of the plurality of collimated light beams to a subject surface, the plurality of collimated light beams at least partially overlapping at the subject surface, and the plurality of collimated light beams being coaxial with light transmitted through an objective lens to the binoculars.

2. An illumination system for a microscope, comprising:
   a. at least one light source producing two uncollimated light beams;
   b. two condensing lenses through which each of the two uncollimated light beams passes separately to two collimating lenses;
   c. the two collimating lenses which collimate each of the two uncollimated light beams separately and pass the two collimated light beams to a beamsplitter; and
   d. the beamsplitter which reflects a portion of the two collimated light beams to a subject surface such that the two collimated light beams overlap partially at the subject surface.

3. The system as in claim 2 further comprising ancillary optics refracting a third light beam to the subject surface, the third light beam being offset at an angle oblique to the axes of the plurality of collimated light beams.

4. The system as in claim 2 further comprising an anti-reflective light absorber, the beamsplitter being positioned between the anti-reflective light absorber and the at least one light source.

5. The system as in claim 1, wherein the plurality of collimated light beams have axes substantially parallel and substantially in the same plane.

6. The system as in claim 1, further comprising ancillary optics which refract a third light beam to the subject surface, the third light beam having an axis which is offset at an angle oblique to the plane created by the axes of the plurality of collimated light beams.

7. The system as in claim 6 wherein the third light beam illuminates the entire visual field of the plurality of collimated beams at the subject surface.

8. The system as in claim 1 further comprising a rheostat for adjusting the intensity of the plurality of collimated light beams.

9. The system as in claim 1 further comprising means for adjusting the width of the plurality of collimated light beams.

10. The system as in claim 6 further comprising a rheostat for adjusting the intensity of the third light beam.

11. The system as in claim 6 further comprising means for adjusting the width of the third light beam.

12. The system as in claim 6 further comprising means for adjusting the ratio of the intensity of light between, on the one hand, the plurality of collimated light beams and, on the other hand, the third light beam.

13. The system as in claim 1 wherein the axes of the plurality of collimated light beams are at an angle of 90 degrees to the subject surface.

14. The system as in claim 1 wherein the plurality of collimated light beams do not pass through the objective lens.

15. The system as in claim 1 wherein the beamsplitter is positioned between the objective lens and the subject surface.

16. The system as in claim 1 wherein the system is a module attached to the microscope.

17. A method of illuminating a subject surface viewable by a binocular microscope comprising
   a. generating a plurality of collimated light beams from at least one light source;
   b. directing the plurality of collimated light beams to a beamsplitter; and
   c. directing a portion of the plurality of collimated light beams from the beamsplitter onto a subject surface where the plurality of collimated light beams at least partially overlap.

18. The method of claim 17, wherein the generating step further comprises passing light from the at least one light source through a first and a second condenser lens to generate a first and second condensed light beam.

19. The method of claim 18, wherein the generating step further comprises passing the first and second condensed light beams through at least one collimating lens.

20. The method of claim 17, wherein the generating step further comprises
   a. passing light from the at least one light source through a condenser lens to generate a single condensed light beam;

b. passing the single condensed light beam through a collimating lens to generate a collimated light beam; and c. splitting the collimated light beam into the plurality of collimated light beams.

21. The method of claim 17, wherein the plurality of collimated light beams have axes coaxial with the axes of the observation beams within the binoculars of the microscope.

22. The method of claim 17, further comprising a. generating a third light beam;

b. directing the third light beam onto the subject surface at an angle oblique to the plurality of collimated light beams.

23. The method of claim 17, wherein the area illuminated by the third light beam overlaps with the plurality of collimated light beams at the subject surface, and is at least equal to the aggregate area of the subject surface illuminated by the plurality of collimated light beams.

* * * * *